United States Patent
Jonsson et al.

[11] Patent Number: 6,067,326
[45] Date of Patent: May 23, 2000

[54] 4 X 4 DIMENSIONAL BLOCK MODULATION CODE FOR A PAM-5 CONSTELLATION

[75] Inventors: Olafur O. Jonsson, Reykjavik; Sverrir Olafsson, Seltjarnarnes, both of Iceland; Sandeep Rajpal, Irvine; Ramin A. Nobakht, Laguna Niguel, both of Calif.

[73] Assignee: Conexant Systems, Inc., Newport Beach, Calif.

[21] Appl. No.: 08/925,552

[22] Filed: Sep. 8, 1997

[51] Int. Cl.$^7$ .............................. H04L 25/34; H04L 25/49
[52] U.S. Cl. ............................. 375/286; 714/752
[58] Field of Search ..................... 375/286, 264, 375/288, 259, 292, 260, 240, 241, 253; 341/56, 20, 52, 55, 57, 58, 59, 60; 327/178, 179; 332/115; 714/752, 802, 804, 810

[56] References Cited

U.S. PATENT DOCUMENTS

| | | | |
|---|---|---|---|
| 4,597,090 | 6/1986 | Forney, Jr. | ................................. 375/261 |
| 5,838,267 | 11/1998 | Wang et al. | ................................ 341/94 |
| 5,872,798 | 2/1999 | Baggen et al. | ............................ 714/755 |

*Primary Examiner*—Don Vo
*Assistant Examiner*—Phuong Phu
*Attorney, Agent, or Firm*—Akin, Gump, Strauss, Hauer & Feld, LLP.

[57] ABSTRACT

A method is disclosed for encoding and modulating bits of an information stream and transmitting them over a designated channel in a high speed communication system. The method includes the steps of dividing a set of the entire constellation of available points into a finite plurality of zero parity vectors defined by two criteria, namely that (1) the column vectors have odd parity and (2) a group of a predefined integer number of column vectors have a 0 modulus (i.e. be divisible by a given number). Column vectors forming only a partially dimensioned portion of the code (e.g. 4D) corresponding to one discrete baud interval are preferably transmitted in a systematic form and with sufficient coding gain for adaptive DFE equalization and whereby a group of column vectors corresponding to an integer number of successive baud intervals that form the fully dimensioned code (e.g. 16D) are transmitted with correlation to one another to achieve an even greater amount of coding gain suitable for high reliability data transmission with error correction and subsequent detection that yield a low bit error rate.

16 Claims, 1 Drawing Sheet

4 X 4 DIMENSIONAL BLOCK MODULATION CODE FOR A PAM-5 CONSTELLATION

BACKGROUND OF THE INVENTION

1. Field of the Invention

The present invention relates generally to high speed communication systems employing multi-dimensional coded modulation schemes.

2. Description of Related Art

A generalized communication system includes a transmitter which transmits symbols to a receiver through a communication "channel." Communication systems have been designed to transmit through a wide variety of channels, including conductive metals such as copper, magnetic storage read/write channels, optical fiber, the atmosphere, water, and so on. All channels have certain problems such that when symbols are transmitted through the channel they may become corrupted. The manner and degree to which such corruption occurs depends on the channel characteristics.

It is imperative to reliably transmit the information through the channel. A common approach to providing such reliability is to encode (channel coding) the information to be sent over the channel so that it is easier to detect the errors introduced by the channel and in addition correct them, so as to reliably obtain the information transmitted through the channel. The code used for encoding the information should be designed and implemented with reference to the characteristics of the channel. The code used for voice or data communications over a telephone channel therefore is likely to be entirely different from that used for an atmospheric channel in satellite communications.

There are two basic ways to perform channel coding—block coding and convolutional coding. With block codes, the system takes successive groups of information bits, usually called a "frame," and codes each such frame into a block, usually called a "code block" or "code word." Using the typical nomenclature, k bits are encoded into n bits where n>k. Each generated code word is independent of all other generated code words. The only thing needed to decode the n bits of a code block therefore are the n bits themselves.

In a convolutional code or "trellis code", by contrast, k bits are encoded into n bits, but with "memory" attached to the n bits in that their values are dependent on the values of prior information bits.

As generally shown by FIG. 1, a modulator is needed to transform the information stream, in this case the encoded data, into a form that is suitable for the channel. In like fashion, a demodulator is used on the receive side of the channel to convert the modulated signals back into an information stream.

The communication industry has determined that channel coding should be optimized to address the combined concerns of the modulator and the channel characteristics. This approach to coding is often called "combined coding and modulation" or simply "coded modulation." Where a block code is used to address both modulation and channel concerns, the terminology is "block coded modulation"—where a trellis code is used, the terminology is "trellis coded modulation."

The present invention is directed only to block coded modulation and is designed to be simple and provide low latency which is an important issue in high speed communications such as in the gigabit ethernet context in which this invention was realized.

A block code is often described with the shorthand notation of (n, k, d) where n=the coded length of the code block, k=the number of information bits, and d=the minimum Hamming distance between code blocks. Given a simple block code that operates on three information bits at a time, i.e. where k=3, and where the coding scheme is simply adding one additional bit to implement even parity, i.e. where n=4, the code may be identified as an even parity (4, 3, 2) code. The reader can easily verify that the minimum bit difference between any two code words is 2 bits such that d=2.

The ultimate goal in any communication system, of course, is to successfully transmit a bit stream over the channel using the "constellation" of modulation levels or permutations available for that channel. Recall from above that the modulator puts the information into a condition that is suitable for transmission over the channel. In order to transmit the information over the channel, therefore, it is necessary to "map" the bits of the information stream onto the available constellation of "modulation levels" or "symbols." The mapping relationship between information bits and transmitted symbols is defined in advance.

There are many modulation techniques which can benefit from the present invention. For background, however, one particularly well known approach is pulse amplitude modulation (PAM). In a PAM-based system, the information bits are mapped into a sequence of electrical signals, or pulses, having two or more voltage levels.

All channels tend to introduce noise and, of particular significance to PAM, introduce amplitude and phase distortion that broadens the pulses and causes intersymbol interference (ISI). The resulting distortion that leads a particular pulse and interferes with past pulses is called precursor ISI and the distortion that follows a particular pulse and interferes with future pulses is called postcursor ISI. The typical receiver includes an "equalizer" which compensates the electric pulses for the channel distortion. In other words, the equalizer attempts to cancel or remove the ISI. The residual channel distortion which remains after the channel equalizer and the noise introduced by the channel make it necessary to channel encode the information bits to provide a higher degree of reliability for the information bits, i.e., a lower probability of error at a given signal to noise ratio (SNR). Usage of a channel coding scheme leads to a lower SNR required to achieve the desired probability of bit error, as compared to the SNR required to achieve the same probability of bit error without the usage of the channel coding scheme. This reduction in SNR is referred to as "coding gain".

At very high data rates such as that required by the presently evolving standard for gigabit Ethernet (e.g. a million bits per second), it is desirable to use a scheme employing block coded modulation which encodes a plurality of data bits into a multi-dimensional constellation of data symbols that provides sufficient information data rate and coding gain. In the context of gigabit Ethernet, for example, the goal is to successfully transmit the information over standard Category 5 unshielded twisted pair (UTP5). UTP5 has eight conductors provided as four twisted pairs which, given one dimensional PAM modulation, form a four dimensional channel of four parallel, PAM modulated "wires."

The prior art block coded modulation schemes known to these inventors do not adequately address the requirements of being a "systematic" code and in addition allowing achievement of sufficient coding gain over each single baud interval to permit adaptive equalization while providing a very high coding gain in transmitting an entire code block over multiple baud intervals to minimize, detect, and correct bit errors.

There remains a need, therefore, for a communication system which employs a block coded modulation scheme over multiple baud intervals on one or more channels.

SUMMARY OF THE INVENTION

In a first aspect, the invention may be regarded as a method of encoding a plurality of information bits into a 4×4 dimensional block modulation code involving four 4D column vectors, the method comprising the steps of causing each 4D column vector of four coordinate points to have odd parity wherein the parity is considered odd if the sum of the four coordinates in the 4D column vector is odd and even otherwise and choosing all of the coordinate points in the four 4D column vectors such that their overall coordinate sum is 0 mod 4.

In a second aspect, the invention may be regarded as a method of encoding a plurality of information bits into a m×n dimensional block modulation code involving n mD column vectors, the method comprising the steps of causing each mD column vector of m coordinate points to have a predefined parity and choosing all of the coordinate points in the n mD column vectors such that the overall codeword in m×n dimensions satisfies an additional parity.

Finally, the invention may be regarded as a method of encoding a plurality of information bits into an m×n dimensional block modulation code having n columns and m rows transmitted over n corresponding baud intervals with respect to a modulation constellation $S_A$, comprising the steps of selecting a systematic vertical code that provides a specified parity on each of the n columns and produces coding gain during each corresponding one of the n baud intervals and selecting a systematic row code that provides a specified parity on the m rows and as such provides dependency between the n columns to provide enhanced coding gain over all of the n corresponding baud intervals.

BRIEF DESCRIPTION OF THE DRAWINGS

The just summarized invention can be best understood with reference to the following description taken in view of the drawings of which.

DETAILED DESCRIPTION OF THE PREFERRED EMBODIMENTS

Figure 1:
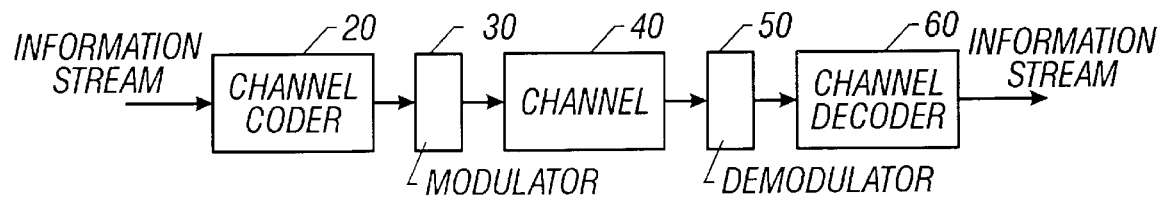
FIG. 1 is a schematic block diagram of a generalized communication system implementing a coded modulation scheme in accordance with the present invention.

FIG. 1 is a simplified, partial block diagram of a general communication system embodying the present invention. As shown, an information stream that is sent from a transmitter to a receiver over a channel 40 using a modulator 30 and a demodulator 50. A channel coder 20, designed with the modulator 30 and channel 40 in mind, encodes successive frames of "k" bits from the information stream into a "n" bit codeword and a channel decoder 60 decodes the code blocks to recover the information stream.

The principles of the present invention may be applied to any communication system. The embodiment described herein, however, was realized in the context of a developing standard for gigabit ethernet, also called 1000baseT, wherein the communication channel comprises four wires as described above. It should be understood that the present invention is not limited to the specifics of this embodiment.

It has been proposed that PAM-5 modulation be used for gigabit ethernet. In such a modulation scheme, the constellation or available set of symbols or modulation levels in terms of voltage is $\{-2, -1, 0, +1, +2\}$. The general requirements imposed on our gigabit ethernet system given this modulation scheme are:

we need to transmit eight information bits over each 4D baud interval (i.e., 8 total information bits over the 4 wires in a single baud interval);

we cannot transmit +2 on all four wires at the same time in order to maintain backward compliance with older IEEE signaling standards;

we must minimize the decoding computational complexity associated with the block modulation code with respect to the number of adds, multiplies, compares, divides, and so on;

we must minimize silicon complexity in terms of production difficulty and size of die to maintain competitive cost factors;

we must provide adequate performance in terms of at least 6 dB of coding gain for the overall modulation code;

we must provide adequate performance in terms of at least 3 dB of coding gain at every 4D baud interval to provide the equalizer with good information at each baud period so that the equalizer, often a DFE equalizer, does not unduly accumulate error; and we must provide a systematic coding scheme that does not "mangle" the bits coded into individual 4D baud intervals or, if the coding scheme is non-systematic and does "mangle" the information bits, it should offer some ability to pre-decode each 4D baud interval into the original bit sequence for use by our equalizer.

In the context of the gigabit ethernet system, the preferred channel coder 20 encodes 32 bits into one of $2^{32}$ codewords that is mapped into the available symbol constellation spread over four 4 wire baud intervals. The signal constellation is a 16 dimensional PAM-5 constellation, which is obtained by taking a subset of the times 16 cartesian product of a PAM-5 constellation. The block modulation code of the present invention uniquely increases the system's immunity to noise over each successive 4D baud interval, independent of all other baud intervals, while providing even more coding gain over a complete series of four baud intervals making up all 16 dimensions.

A first aspect of the innovation resides in how we pick and choose the subsets when we break the set corresponding to the overall symbol constellation into several candidate subsets. In the gigabit ethernet case where the PAM-5 signals are transmitted over successive 4D baud intervals, for example, the set corresponding to the overall symbol constellation is quite large. The 1D set corresponding to a baud interval on a single wire contains 5 points and the 4D set corresponding to a baud interval on all four wires contains $5^4$ or 625 points. Recall that one of our gigabit ethernet requirement was to encode 8 bits into each 4 dimensional (or commonly referred to as 4D) baud interval. If we encode 32 information bits into a 16D code transmitted over four successive 4D baud intervals to obtain an overall coding gain that is desirably high (e.g. 6 dB), the bits would select a point from a constellation of $2^{32}$ points. These $2^{32}$ constellation points would form a subset of (PAM-5)$^{16}$, where (PAM-5)$^{16}$ denotes the 16 times cartesian product of a PAM-5 constellation. Note, (PAM-5)$^{16}$ contains $5^{16}$ or over 152 billion points. Clearly, it can be a daunting task to define the subset that would make such encoding feasible if not approached correctly.

Subset Definition

Figure 2:
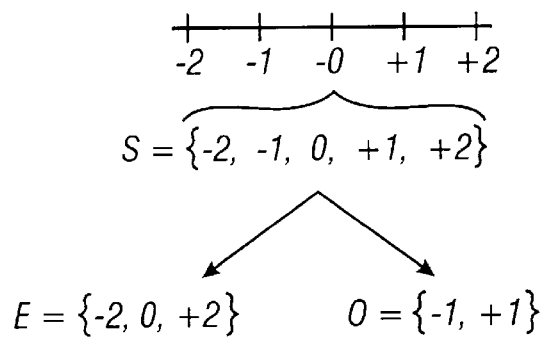
FIG. 2 is a diagram indicating the five points in a single dimension of PAM-5 modulation and the division of such constellation into even (E) and odd (O) sets in accordance with a preferred embodiment of the present invention.

We define our subsets as follows. First we take the 5 points of a single 1D set ("S") and partition it into even ("E") and odd ("O") subsets as shown in FIG. 2 and as follows:

$$S = \{-2, -1, 0, +1, +2\}$$

$$E = \{-2, 0, +2\} \quad O = \{-1, +1\}$$

Next, we consider the 625 possible 4D points formed by taking the four times cartesian product of PAM-5 constellation. This set is denoted as (PAM-5)$^4$. Denote the parity of a point in (PAM-5)$^4$ to be odd if the sum of the four coordinates of the point is odd and even otherwise. Denote $S_{4\text{-}odd}$ to be a subset of (PAM-5)$^4$ such that every point in $S_{4\text{-}odd}$ has odd parity. Using the "E" and "O" subset definition as defined above, $S_{4\text{-}odd}$ contains the following points:

54 points in (p1, p2, p3, p4), such that p1∈E, p2∈E, p3∈O and p4∈E;

54 points in (p1, p2, p3, p4), such that p1∈O, p2∈E, p3∈E and p4∈E;

54 points in (p1, p2, p3, p4), such that p1∈E, p2∈E, p3∈E and p4∈O;

54 points in (p1, p2, p3, p4), such that p1∈E, p2∈O, p3∈E and p4∈E;

24 points in (p1, p2, p3, p4), such that p1∈O, p2∈O, p3∈E and p4∈O;

24 points in (p1, p2, p3, p4), such that p1∈E, p2∈O, p3∈O and p4∈O;

24 points in (p1, p2, p3, p4), such that p1∈O, p2∈O, p3∈O and p4∈E;

24 points in (p1, p2, p3, p4), such that p1∈O, p2∈E, p3∈O and p4∈O;

The total number of points in $S_{4\text{-}odd}$ is 312. If $x_1$, $x_2$, $x_3$, $x_4 \in S_{4\text{-}odd}$, then the number of distinct 16D vectors ($x_1$, $x_2$, $x_3$, $x_4$) is $312^4$ which is greater than $2 \ast 2^{32}$. We can, therefore, cut the number of allowed 16D vectors in half to provide enhanced minimum squared Euclidean distance between points and still be able to encode 32 bits per 16D symbol.

We define the following set:

$S_{16}$ is the set of all 16D vectors whose 4D coordinates are members of $S_4$, odd and whose coordinate sum is 0 mod 4. That is $$S_{16} = \left\{ (X_1, X_2, X_3, X_4) : X_{1\ldots4} \in S_{4\text{-}odd} \text{ and } \sum_{i=1}^{4}\sum_{j=0}^{3} X_i[j] \equiv 0 \bmod 4 \right\}$$

$S_{16}$ has the following properties:

i) If $y_1, y_2 \in S_{16}$ then $d(y_1, y_2) \geq 4$, where $d(.,.)$ denotes the minimum squared Euclidean distance between the two vectors; and ii) Number of 16D vectors in $S_{16}$ is $$\frac{312^4}{2} > 2^{32}$$

iii) The coordinate sum in each 4D baud interval is odd (more commonly referred to as odd parity), and the overall coordinate sum spread over four 4D baud intervals is a multiple of 4. This enables error detection at the receiver, since if a 4D baud interval is received as an even parity, the aforementioned constraints would flag an error.

$S_{16}$ is used as the base constellation for encoding the 32 bits per 16 dimensions and defines the block modulation code of the proposed invention.

Alternative Way of Viewing Subset Definition

This alternative way of looking at the encoding scheme is offered to give some insight as to how the code looks and operates, an insight that may be especially helpful in developing an optimal method of decoding the encoded data (not disclosed herein).

Given the $5^4 = 625$ possible vectors at each baud interval, 312 such vectors have odd parity and 313 have even parity. The initial description mathematically defined how we formed our 16D vectors by constraining each of our constituent 4D vectors to one of the 312 combinations that provides odd parity and by constraining the overall 16D code to one that provides 0 mod 4. Stated in more linguistic terms, we want to form the four 4D vectors according two conditions or constraints:

1. We want each column vector to have odd parity; and
2. We want to choose all of the points in four column vectors such that their sum is an integer multiple of 4.

The first condition of odd parity provides the first level of coding gain. When the first and second constraints are combined, however, there is correlation between the column vectors. This correlation provides the second level of coding gain, which can be realized by decoding the code over 16 dimensions. This is, perhaps, best understood by viewing the creation of the codewords during the coding operation as the result of a "product" coding involving successive applications of an odd parity vertical column code and a horizontal row code which ensures that the overall parity is 0 mod 4.

The invention cam be generalized with respect to an arbitrary constellation $S_A$ as selecting a systematic vertical code that provides a specified parity on the columns and produces coding gain during each baud interval and as selecting a systematic row code that provides a specified parity on the rows and produces a certain distance and dependency between the columns to provide enhanced coding gain over a plurality of baud intervals.

Selection of Points within the 312 4D Vectors

At this point, it remains to be defined how to map 32-bit blocks onto the 16D members of $S_{16}$.

Figure 3:
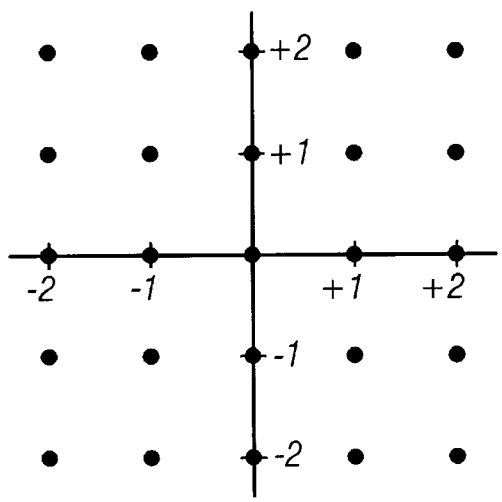
FIG. 3 is the 2D constellation obtained by taking the cartesian product of two PAM-5 modulations as shown in FIG. 2.

We accomplish this selection by partitioning the 2D (PAM-5)$^2$ set (shown in FIG. 3) into 8 subsets a, b, c, d, e, f, g, and h. The resulting partitioning as applied to the points shown in FIG. 3 is shown as follows:

```
a  b  c  d  a
e  f  g  h  e
c  d  a  b  c
g  h  e  f  g
a  b  c  d  a
``` i.e. a={(−2,2), (2,2), (0,0), (−2,−2), (2,−2)}; b={(−1,2), (1,0), (−1,−2)}; and so on.

We then construct 4D subsets as follows:

$s(0,0)=ab+cd+fb+hd$ $s(0,1)=ag+ce+fg+he$ $s(0,2)=ba+dc+bf+df$ $s(0,3)=ga+ec+gf+eh$ $s(1,0)=ad+cb+fd+hb$ $s(1,1)=ae+cg+fe+hg$ $s(1,2)=da+bc+df+bh$ $s(1,3)=ea+gc+ef+gh$

Here, each s(i,j), where $0 \leq i \leq 1$, $0 \leq j \leq 3$ has 39 elements and we split them into s1(i,j) with 32 elements and s2(i,j) with 7 elements.

Each s(0,j) has a coordinate sum of 1 and each s(1,j) has a coordinate sum of 3. We construct our particular 16D code by combining members of s(i,j) such that the overall coordinate sum is a multiple of 4, i.e. 0 mod 4.

The above represents a breaking up of the partitioning into two sets, one of which has 1 mod 4 parity [S(0,j)] and the other of which has 3 mod 4 parity [S(1,j)]. You could, of course, have a partitioning which creates subsets which have four choices of parities such as 1 mod 8, 3 mod 8, 5 mod 8, and 7 mod 8, provided that you produce an overall parity of 0 mod 4 which is equivalent to 0 mod 8 or 4 mod 8.

In our particular example, we first take 3 information bits, a0, a1, a2, and 8 information bits b00, b01, b10, b11, b20, b21, b30, b31 to select the subsets (among the s(i,j)) from which the final 16D point will be selected. The following represents the constrained set of 16D points selected by the aforementioned 11 bits from which the selected 16D point will be selected:

{s(a0, (2*b00+b01)), s(a1, (2*b10+b11)), s(a2,(2*b20+b21)), s(a3, (2*b30+b31))}

Here, a3=(a0+a1+a2) mod 2 is selected to make the coordinate sum 0 mod 4. The first baud interval point is selected from s(a0, (2*b00+b01)); the second baud interval point is selected from s(a1, (2*b10+b11)); the third baud interval point is selected from s(a2, (2*b20+b21)); and the fourth baud interval point is selected from s(a3, (2*b30+b31)).

We have used the first 11 information bits to select the s(i,j) for the four 4D symbols. We thus have 21 information bits remaining in the frame of 4T which remain to be encoded. These bits will be used to select from the chosen s(i,j). The first bit c is used to decide the selection of points from s1 and s2.

Case 1: If c=0, then all points are selected from s1(i,j), i.e. all 4 of the 4D points. Since there are 32 elements in s1(i,j), this requires 4×5 bits or the 20 remaining bits.

Case 2: If c=1, then we check the next 3 bits, d0,d1,d2. If they are not all 1's, then we will select one of the four 4D points from s2(i,j), the rest from s1(i,j). The next two bits, e0,e1,determine which of the four 4D symbols will use s2(i,j). Since (4*d0+2*d1+d2) is in the range 0–6, this will therefore select which point in s2(i,j) to use. The remaining 15 bits are used to select from the 32 elements in each s1(i,j).

Case 3: If c=1, and d0=d1=d2=1, then two of the 4D subsets are selected from s2(i,j). e0 and e1 determine which two as follows:

| e0 | e1 |    |    |    |    |
|----|----|----|----|----|----|
| 0  | 0  | s1 | s2 | s1 | s2 |
| 0  | 1  | s2 | s1 | s2 | s1 |
| 1  | 0  | s1 | s2 | s2 | s1 |
| 1  | 1  | s2 | s1 | s1 | s2 |

We are then left with 15 bits, 2×5 to select from the s1 subsets, and 5 to select 2 points from the s2 subsets. Since there are 7×7=49 elements to select from, and 5 bits to select, there will be 17 elements not selected, which can be used for special signaling. Also, 16D points using 3 or 4 points from s2 subsets are not included here, and could also be used for special signaling.

The following is a summary of the preferred mapping as described above:

Case 1. All four 4D points selected from certain s1 subsets and c=0. Let the bit sequence associated with this case be as follows. The description following the case descriptions describes how the mapping would be performed:

a0 a1 a2 b00 b01 b10 b11 b20 b21 b30 b31 c f00 . . . f04 f10 . . . f14 f20 . . . f24 f30 . . . f34

Case 2. One 4D point is selected from a certain s2 subset and the remaining from certain s1 subsets, c=1 and (4*d0+2*d1+d2)<7. Let the bit sequence associated with this case be as follows. The description following the case descriptions describes how the mapping would be performed:

a0 a1 a2 b00 b01 b10 b11 b20 b21 b30 b31 c d0 d1 d2 e0 e1 f00 . . . f04 f10 . . . f14 f20 . . . f24

Case 3. Two 4D points are selected from certain s2 subsets and the remaining two 4D points are selected from certain s1 subsets, c=1 and d0=d1=d2=1. Let the bit sequence associated with this case be as follows. The description following the case descriptions describes how the mapping would be performed:

a0 a1 a2 b00 b01 b10 b11 b20 b21 b30 b31 c d0 d1 d2 e0 e1 g0 . . . g4 f00 . . . f04 f10 . . . f14

In all cases, ak and bij, where $0 \leq k \leq 2$, $0 \leq i \leq 3$, $0 \leq j \leq 1$ select s(ak, (2*bi0+bi1));

fn0 . . . fn4, where $0 \leq n \leq 3$ select from a certain s1 subset;

if c=1, d0, d1 and d2 select from a certain s2 subset if they are not all 1;

If c=1 and d0=d1=d2=1, g0 . . . g4 select two elements from certain s2 subsets; and e0e1 select the sequence of s1 and s2 subsets, as per the table defined above.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of encoding a plurality of information bits into a 4×4 dimensional block modulation code involving four 4D column vectors, the method comprising the steps of:
   receiving the plurality of information bits;
   arranging the information bits in format of four 4D column vecotors;
   causing each 4D column vector of four coordinate points to have odd parity wherein the parity is considered odd if the sum of the four coordinates in the 4D column vector is odd and even otherwise;
   choosing all of the coordinate points in the four 4D column vectors such that their overall coordinate sum is 0 mod 4; and
   outputting the successive four 4D column vectors.

2. The method of claim 1 comprising the further step of modulating successive 4D column vectors onto a communication channel.

3. The method of claim 2 wherein the modulating step uses a constellation having an odd number of modulation levels.

4. The method of claim 1 comprising the further step of modulating successive 4D column vectors onto four conductors at respectively successive baud intervals.

5. The method of claim 4 wherein the four conductors are twisted pairs.

6. The method of claim 4 wherein the modulating step uses a PAM constellation having an odd number of voltage levels.

7. The method of claim 6 comprising the further steps of dividing each the available voltage levels of the PAM constellation into an even subset ("E") containing only even levels and an odd subset ("O") containing only odd levels.

8. The method of claim 6 wherein the PAM constellation having an odd number of voltage levels is a PAN-5 constellation having five levels.

9. The method of claim 7 wherein the PAM-5 constellation is defined by a set of available voltage levels comprising $\{-2, -1, 0, +1, +2\}$.

10. The method of claim 9 comprising the further steps of dividing each the five available voltage levels of the PAM-5 constellation into an even subset ("E") containing only even levels $\{-2, 0, +2\}$ and an odd subset ("O") containing only odd levels $\{-1, +1\}$.

11. The method of claim 10 comprising the further step of forming 312 member subset containing 312 odd points out of the total $5^4$ (625) possible points in a 4D PAM-5 constellation using the odd ("O") and even ("E") subsets to form a plurality of composite subsets containing only odd points.

12. The method of claim 11 wherein the plurality of composite subsets containing only odd points comprises the following eight composite subsets:
   54 points in (p1, p2, p3, p4), such that p1∈E, p2∈E, p3∈O and p4∈E;
   54 points in (p1, p2, p3, p4), such that p1∈O, p2∈E, p3∈E and p4∈E;
   54 points in (p1, p2, p3, p4), such that p1∈E, p2∈E, p3∈E and p4∈O;
   54 points in (p1, p2, p3, p4), such that p1∈E, p2∈O, p3∈E and p4∈E;
   24 points in (p1, p2, p3, p4), such that p1∈O, p2∈O, p3∈E and p4∈O;
   24 points in (p1, p2, p3, p4), such that p1∈E, p2∈O, p3∈O and p4∈O;
   24 points in (p1, p2, p3, p4), such that p1∈O, p2∈O, p3∈O and p4∈E; and
   24 points in (p1, p2, p3, p4), such that p1∈O, p2∈E, p3∈O and p4∈O.

13. The method of claim 12 comprising the further step of forming a set of 16D vectors whose 4D coordinates are members of the plurality of composite subsets containing only odd points in accordance with the following formula:

$$S_{16} = \left\{ (X_1, X_2, X_3, X_4) : X_{1...4} \in S_{4\text{-}odd} \text{ and } \sum_{i=1}^{4}\sum_{j=0}^{3} X_i(j) \equiv 0 \bmod 4 \right\}$$

wherein $S_{4\text{-}odd}$ is a subset of a 4D PAM-5 constellation such that every point in $S_{4\text{-}odd}$ has odd parity;
   $S_{16}$ is the set of all 16D vectors whose 4D coordinates, $X_1$, $X_2$, $X_3$, and $X_4$, are members of $S_{4\text{-}odd}$ and whose coordinate sum is 0 mod 4;
   $X_{1...4}$ is represented for the 4 coordinate components, $X_1$, $X_2$, $X_3$, and $X_4$, and $X_i[j]$ is the jth subcomponent of $X_i$.

14. The method of claim 13 comprising the further steps of:
   forming a 2D (PAM-5)$^2$ set;
   partitioning the 2D (PAM-5)$^2$ set into 8 subsets a, b, c, d, e, f, g, and h; and
   constructing eight 4D subsets as follows:

$s(0,0)=ab+cd+fb+hd$ $s(0,1)=ag+ce+fg+he$ $s(0,2)=ba+dc+bf+df$ $s(0,3)=ga+ec+gf+eh$ $s(1,0)=ad+cb+fd+hb$ $s(1,1)=ae+cg+fe+hg$ $s(1,2)=da+bc+df+bh$ $s(1,3)=ea+gc+ef+gh$ where for $0 \leq i \leq 1$, $0 \leq j \leq 3$ each s(i,j) has 39 elements that are split into s1(i,j) with 32 elements and s2(i,j) with 7 elements, and where each s(0,j) has a coordinate sum of 1 and each s(1,j) has a coordinate sum of 3.

15. A method of encoding a plurality of information bits into a m×n dimensional block modulation code involving n mD column vectors, the method comprising the steps of:
   receiving the plurality of information bits;
   arranging the information bits in format of n mD column vectors;
   causing each mD column vector of m coordinate points to have odd parity wherein the parity is considered odd if the sum of the m coordinate points in the mD column vector is odd and even otherwise;
   choosing all of the coordinate points in the n mD column vectors such that their coordinate sum is a specified modulus of n; and
   outputting the successive n mD column vectors.

16. A method of encoding a plurality of information bits into a m×n dimensional block modulation code having n columns and m rows transmitted over n corresponding baud intervals with respect to a modulation constellation SA, the method comprising the steps of:

receiving the plurality of information bits;

arranging the information bits in format of n mD column vectors;

selecting a systematic vertical code that provides a specified parity on each of the n columns and produces coding gain during each corresponding one of the n baud intervals;

selecting a systematic row code that provides a specified parity on the m rows and provides a dependency between the n columns to provide enhanced coding gain over all of the n corresponding baud intervals; and outputting the successive n mD column vectors.

* * * * *